United States Patent [19]

Sakakura et al.

[11] Patent Number: 5,773,731
[45] Date of Patent: Jun. 30, 1998

[54] METHOD AND APPARATUS FOR DETECTING RESIDUAL GRINDING AMOUNT

[75] Inventors: Moriaki Sakakura; Takayuki Hotta, both of Nagoya; Satoshi Abeta, Okazaki, all of Japan

[73] Assignee: Toyoda Koki Kabushiki Kaisha, Kariya, Japan

[21] Appl. No.: 652,273

[22] Filed: May 22, 1996

[30] Foreign Application Priority Data

May 23, 1995 [JP] Japan .................................. 7-123632

[51] Int. Cl.$^6$ .................................................. B24B 49/00
[52] U.S. Cl. ................................................ 73/865.8; 451/5
[58] Field of Search ............................ 73/865.8, 1 J; 33/504, 628; 245/277, 279, 280; 451/5

[56] References Cited

U.S. PATENT DOCUMENTS 5,562,523  10/1996  Asano et al. ................................. 451/9
5,562,526  10/1996  Yoneda et al. .............................. 451/1

FOREIGN PATENT DOCUMENTS 7 32245   2/1995   Japan .

*Primary Examiner*—Robert Raevis
*Attorney, Agent, or Firm*—Oblon, Spivak, McClelland, Maier & Neustadt, P.C.

[57] ABSTRACT

An apparatus for detecting a residual grinding amount includes first and second feelers adapted to contact the peripheral surface of a workpiece such that they move, in accordance with a variation in the diameter of the workpiece, in opposite directions each perpendicular to the direction of deflection of the workpiece, and a first displacement detector for detecting relative displacement between the first and second feelers. The apparatus also includes a third feeler adapted to contact the peripheral surface of the workpiece such that it moves, in accordance with the variation in the diameter of the workpiece as well as a variation in the deflection of the workpiece, in the direction of deflection of the workpiece, and a second displacement detector for detecting displacement of the third feeler. The residual grinding amount is calculated based on the displacements detected by the first and second displacement detectors.

8 Claims, 6 Drawing Sheets

METHOD AND APPARATUS FOR DETECTING RESIDUAL GRINDING AMOUNT

BACKGROUND OF THE INVENTION

1. Field of the Invention

The present invention relates to a method and apparatus for detecting a residual grinding amount, which corresponds to an amount of deflection of a workpiece caused by grinding resistance.

2. Discussion of Relate Art

FIG. 1 shows a conventional cylindrical grinding machine, in which a wheel head carrying a rotating grinding wheel 19 is fad toward a workpiece W, which is supported by centers 15a and 16a attached to a work head and a tailstock, respectively, thereby carrying out grinding (plunge grinding) with or without adaptive control. In such a cylindrical grinding machine, a residual grinding amount, which corresponds to an amount of deflection of a workpiece caused by grinding resistance, is detected and is used for various kinds of control.

For example, in the grinding machine disclosed in Japanese Patent Application No. 7-17654 in which grinding is performed through a grinding cycle consisting of rough grinding, back-off grinding, and finish grinding, a grinding residual amount and the variation rate of the diameter of a workpiece are calculated constantly, and the timing of the start of the back-off grinding is determined based on the thus calculated values. In this grinding apparatus, the grinding residual amount is detected as the difference between the position of a grinding wheel and the diameter of a workpiece. The position of the grinding wheel is measured based on the output of an encoder connected to a wheel head feed shaft, while the diameter of the workpiece is. measured by an in-process measuring device.

In order to start back-off grinding at a proper timing in the grinding machine disclosed in Japanese Patent Application No. 7-17654, it is essential to measure accurately a grinding residual amount, the variation rate of the diameter of a workpiece, and the like. However, since the position of the grinding wheel detected by the encoder is likely to be affected by thermal deformation of the grinding machine and wear of the grinding wheel, the grinding residual amount cannot be detected accurately. Therefore, the conventional grinding machine has a drawback that it cannot determine properly a start timing of the back-off grinding, resulting in prolonged grinding cycle time and poor quality of workpieces. In addition, when a residual grinding amount is detected in the conventional grinding machine, it is necessary to perform a calibrating operation for compensating for error in the position of the grinding point of the grinding wheel. This calibrating operation is performed as follows. The grinding wheel is first fed into a workpiece by a small amount, and then spark-out grinding is performed for a sufficient period of time so as to eliminate deflection of the workpiece, whereby the position of the grinding point of the grinding wheel represented as a workpiece diameter is made to coincide with the actual diameter of the workpiece. Since the calibration operation must be performed frequently, productivity decreases considerably.

SUMMARY OF THE INVENTION

An object of the present invention is to provide an improved method and apparatus for accurately detecting a residual grinding amount (amount of deflection) without being affected by thermal deformation of a grinding machine and wear of a grinding wheel.

Briefly, according to a first aspect of the present invention, there is provided a method for detecting a residual grinding amount produced due to grinding resistance between a workpiece and a grinding wheel during grinding operation. The method comprises the steps of measuring the outer diameter of a workpiece in a direction perpendicular to the direction of deflection of the workpiece, measuring the position of the peripheral surface of the workpiece in the direction of deflection of the workpiece, and calculating a residual grinding amount based on the measured diameter and the position of the peripheral surface of the workpiece.

According to a second aspect of the present invention, there is provided an apparatus for detecting a residual grinding amount produced due to grinding resistance between a workpiece and a grinding wheel during grinding operation. The apparatus comprises first measuring means for measuring the outer diameter of a workpiece in a direction perpendicular to the direction of deflection of the workpiece, second measuring means for measuring the position of the peripheral surface of the workpiece in the direction of deflection of the workpiece, and calculation means for calculating a residual grinding amount based on the diameter of the workpiece measured by the first measuring means and the position of the peripheral surface of the workpiece measured by the second measuring means.

Preferably, the first measuring means comprises first and second feelers adapted to contact the peripheral surface of a workpiece such that they move, in accordance with a variation in the diameter of the workpiece, in opposite directions each perpendicular to the direction of deflection of the workpiece, a first displacement detector for detecting relative displacement between the first and second feelers, and the second measuring means comprises a third feeler adapted to contact the peripheral surface of the workpiece such that it moves, in accordance with the variation in the diameter of the workpiece as well as a variation in the deflection of the workpiece, in the direction of deflection of the workpiece, and a second displacement detector for detecting displacement of the third feeler.

As described above, in the method and apparatus for detecting a residual grinding amount according to the present invention, the residual grinding amount can be detected without utilizing the position of the grinding wheel which tends to contain an error due to thermal deformation of the grinding machine and wear of the grinding wheel. Accordingly, the residual grinding amount (amount of deflection) can be detected accurately without being affected by thermal deformation of the grinding machine and wear of the grinding wheel. Moreover, since it becomes unnecessary to calibrate the position of the wheel head, productivity can be increased.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENT

An embodiment of the present invention will now be described with reference to the drawings.

Figure 1:
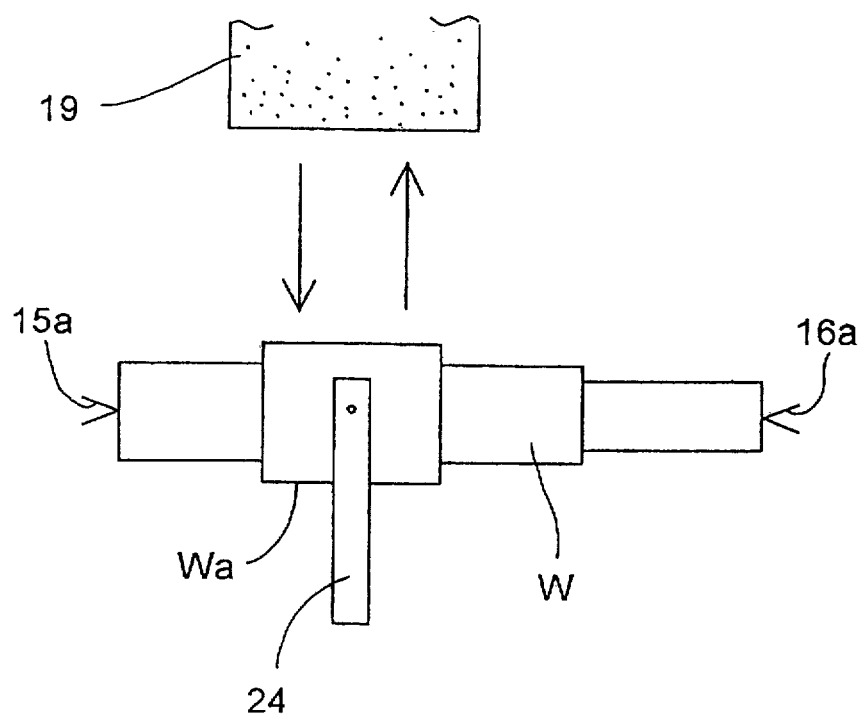
FIG. 1 is an explanatory view showing a conventional grinding operation.
Figure 2:
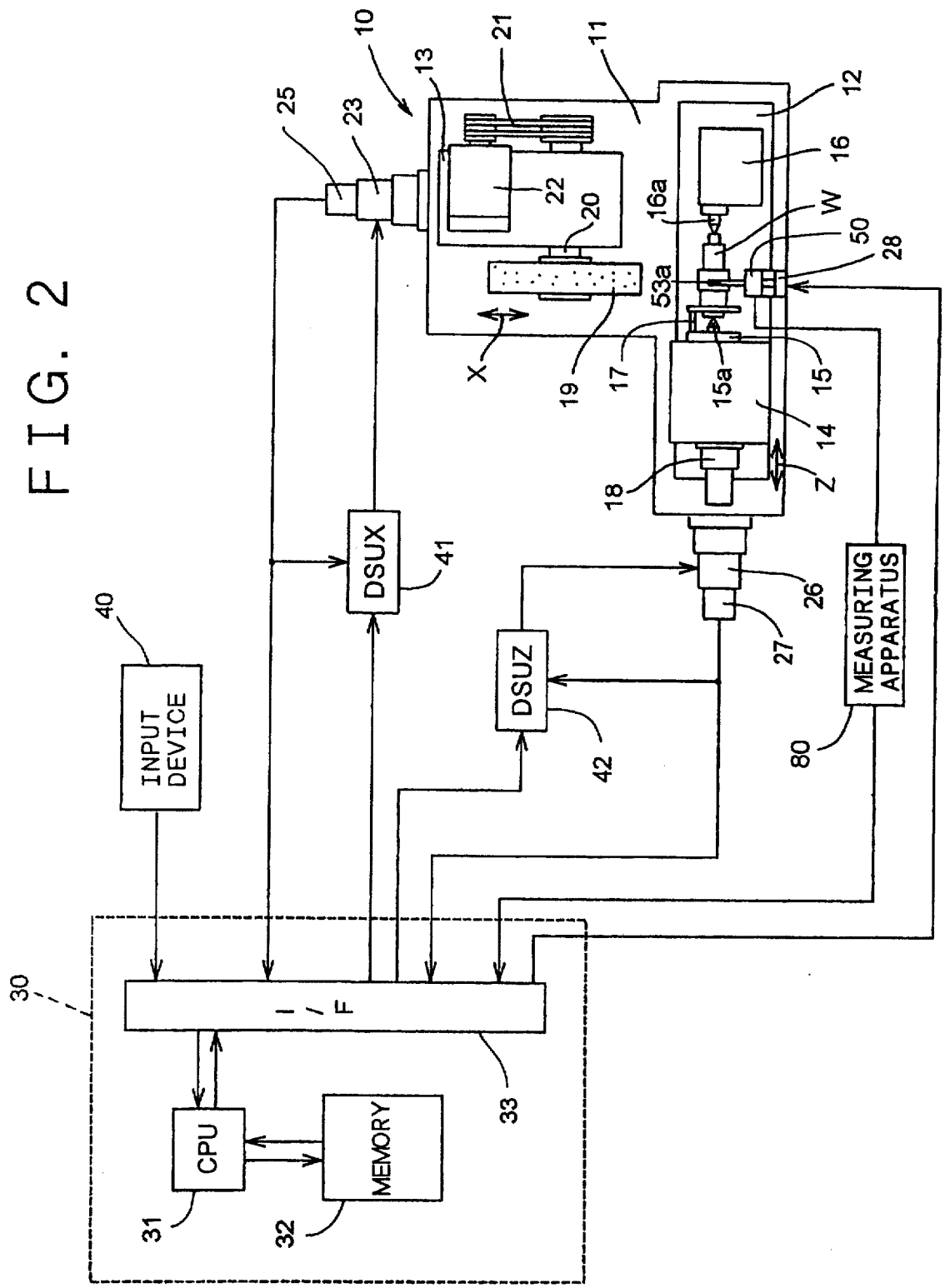
FIG. 2 is a diagram showing the overall structure of a grinding machine according to an embodiment of the present invention.

Referring to FIG. 2, numeral 10 denotes a grinding machine in which a table 12 is mounted on a bed 11 so as to provide movement in the Z-axis direction. A work head 14 rotatably supporting a work spindle 15, and a tailstock 16 are mounted on the table 12 at the right and left ends thereof, respectively, such that they face each other. The work spindle 15 is rotated by a motor 18 disposed on the work head 14. A workpiece W is supported between a center 15a provided on the work spindle 15 and a center 16a provided on the tailstock 16 through both ends thereof, and the left end of the workpiece W is engaged with a drive pin 17 projecting from the work spindle 15 so that the workpiece W rotates with the work spindle 15.

Further, on the bed 11 is supported a wheel head 13 which is movable in the X-axis direction perpendicular to the Z-axis direction. On the wheel head 13, a grinding wheel 19, such as a CBN grinding wheel, is supported by a wheel spindle 20 which is parallel to the work spindle 15 and which is driven by a motor 22 via a V-belt transmission mechanism 21.

Servomotors 23 and 26 provided on the bed 11 are respectively controlled by digital servo units 41 and 42 which operate in accordance with command signals from a numerical controller 30. The servomotor 23 moves the wheel head 13 in the X-axis direction via an unillustrated ball screw mechanism. The servomotor 26 moves the table 12 in the Z-axis direction via an unillustrated ball screw mechanism. Position detectors 25 and 27 such as encoders are provided so as to detect the positions of the wheel head 13 and the table 12, respectively, based on the rotational amounts of the corresponding servomotors 23 and 26. The detected positions are input to the digital servo units 41 and 42 for feedback control and are also input to the numerical controller 30 via unillustrated amplifiers.

Figure 3:
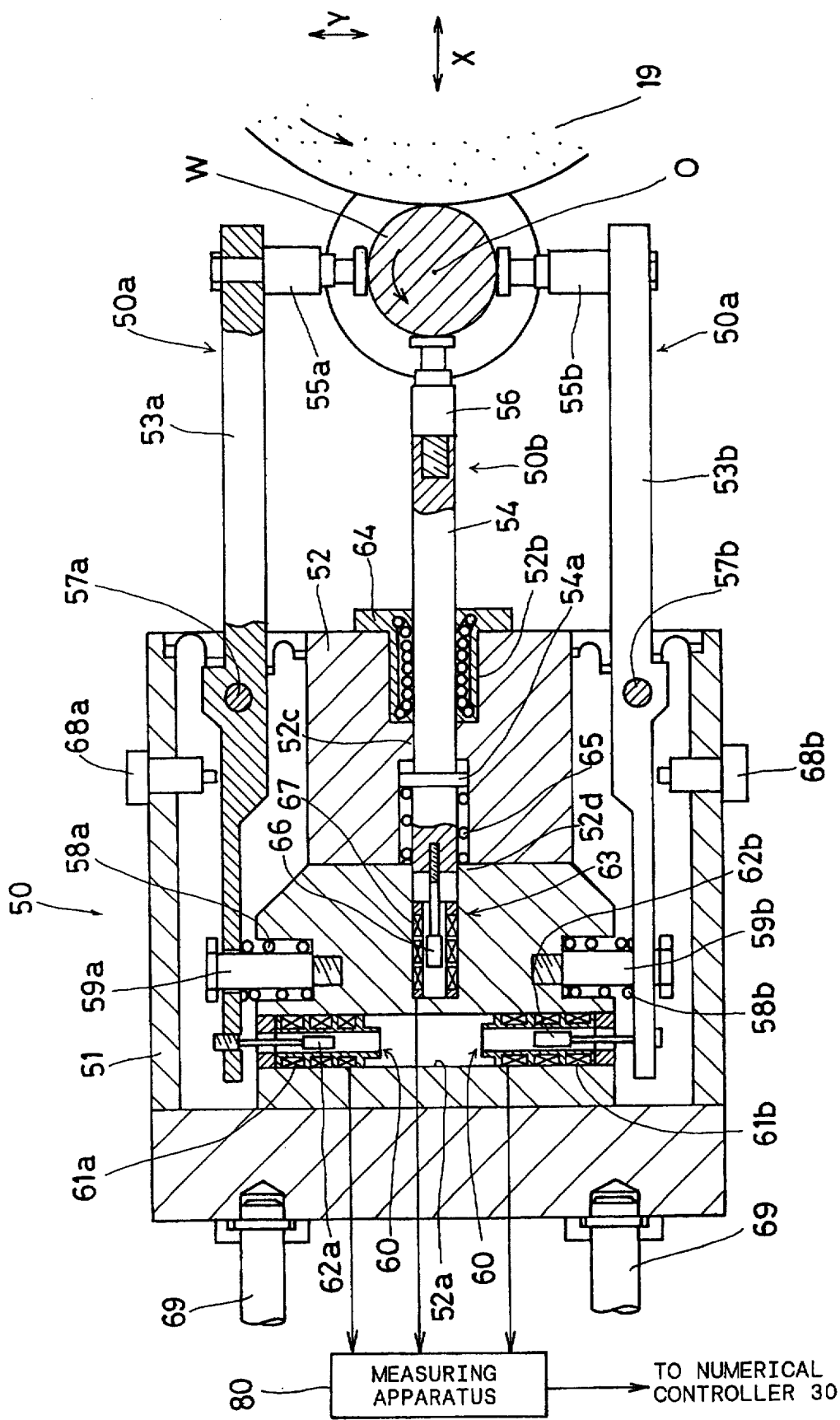
FIG. 3 is a sectional view showing the structure of a measuring head used in the grinding machine shown in FIG. 2.

Moreover, a measuring head 50 is disposed on the bed 11 at such a position that the measuring head 50 faces the grinding wheel 19. The measuring head 50 measures the diameter of the workpiece W and also measures the position of the peripheral surface of the workpiece W in the direction of deflection of the workpiece (hereinafter simply referred to as, the "peripheral position"). As shown in FIG. 3, three feelers 55a, 55b and 56 of the measuring head SO contact the peripheral surface of the workpiece W. When machining is performed, a head feed unit 29 advances the measuring head 50 toward the workpiece W until it reaches a predetermined position. When the workpiece W is to be exchanged for a next workpiece, the head feed unit 28 retracts the measuring head 50 so that it becomes separated from the workpiece W. The head feed unit 28 is driven in accordance with command signals from the numerical controller 30.

Next, the measuring head 50 will be described in more detail with reference to FIG. 3. As shown in FIG. 3, the measuring head 50 is mainly composed of a main body 51, a first measuring section 50a, and a second measuring section 50b. The first measuring section 50a measures the diameter of the workpiece w in a Y-axis direction perpendicularly to the feed direction (X-axis direction) of the wheel head 13. The second measuring section 50b measures the peripheral position of the workpiece W at the point which is opposite to the grinding point with respect to the rotational axis O of the workpiece W.

The main body 51 is a box-shaped member having an opening at its front end, and v mount block 52 is fixed inside the main body 51. The main body 51 is connected to the above-described head feed unit 28 via a pilot bar 69, which is connected to the rear end of the main body 51. The main body 51 is supported for advance and retract movement relative to the bed 11 in a direction parallel to the feed direction of the wheel head 13 (X-axis direction).

The first measuring section 50a is mainly composed of paired first and second arms 53a and 53b, paired first and second feelers 55a and 55b, paired first and second coils 61a and 61b, and a pair of cores 62a and 62b.

The first arm 53a is disposed in an upper space between the upper wall of the main body 51 and the mount block 52 and is pivotably supported by a pivot pin 57a, while the second arm 53b is disposed in a lower space between the lower wall of the main body 51 and the mount block 52 and is pivotably supported by a pivot pin 57b. The first and second feelers 55a and 55b are detachably attached to front ends of the first and second arms 53a and 53b, respectively, and contact the outer. periphery of the workpiece W at upper and lower portions thereof. Springs 58a and 58b are disposed between rear portions of the first and second arms 53a and 53b and the mount block 52 so as to urge the first and second arms 53a and 53b in opposite directions such that the first and second feelers 55a and 55b approach each other. The swing movements of the first and second arms 53a and 53b are restricted by bolts 59a and 59b fixed to the mount block 52. Retracting units 68a and 68b each consisting of a cylinder are attached to the main body 51 so as to separate the first and second feelers 55a and 55b against the spring forces of the springs 58a and 58b.

The above-described cores 62a and 62b are connected to the rear ends of the first and second arms 53a and 53b, respectively. Further, a mount hole 52a is provided at the back of the mount block 52 fixed to the main body 51, and the above-mentioned first and second coils 61a and 61b are inserted into the mount hole 52a such that the cores 62a and 62b are axially movable within the first and second coils 61a and 62b, respectively. The first coil 61a and the core 62a constitute a first differential transformer, while the second coil 61b and the core 62b constitute a second differential transformer. The first and second coils 61a and 61b are connected to each other so as to detect relative displacement between the first and second feelers 53a and 53b. The first and second coils 61a and 61b and the cores 62a and 62b constitute a first displacement detector 60. A relative displacement between the first and second feelers 55a and 55b detected by the first displacement. detector 60 represents the diameter of the workpiece W in the Y-axis direction. A measurement signal (analog signal) corresponding to the measured diameter is output to the measuring apparatus 80, which will be described later.

The second measuring section 50b is mainly composed of a third arm 54, a third feeler 56, a core 66, and a third coil 67.

The third arm 54 is a bar-shaped member and has longitudinally extending spline grooves on the periphery thereof. A spline nut 64 is fitted into a mount bore 52b, which is formed in the mount block 52 and extends in the X-axis direction. The spline grooves of the third arm 54 are engaged with the spline nut 64 so as to constitute a ball spline, which allows advance and retract movement of the third arm 54 in the X-axis direction. The above-mentioned third feeler 56 is detachably attached to the front end of the third arm 54, so that the third feeler 56 contacts the peripheral surface of the workpiece W at a point which is opposite to the grinding point with respect to the rotational axis O of the workpiece W. A flange 54a is formed at the rear portion of the third arm 54, and a spring 65 is disposed between the flange 54a and a stepped portion 52d of the mount bore 52b so as to urge the third feeler 56 toward the workpiece W. The third arm 54 is prevented from advancing beyond a predetermined point through engagement between the flange 54a and an engagement portion 52c of the mount bore 52b.

The above-mentioned core 66 is connected to the rear end of the third arm 54 and movably received by the above-mentioned third coil 67 disposed at the rear end of the mount bore 52b. The third coil 67 and the core 66 constitute a third differential transformer serving as a second displacement detector 63 for detecting displacement of the third feeler 56. The displacement of the third feeler 56 measured by the second displacement detector 63 represents the peripheral position of the workpiece W in the X-axis direction, which varies depending on both a variation in the diameter of the workpiece and a deflection of the workpiece W. A measurement signal (analog signal) corresponding to the measured peripheral position of the workpiece W is output to the measuring apparatus 80, which will next be described.

Figure 4:
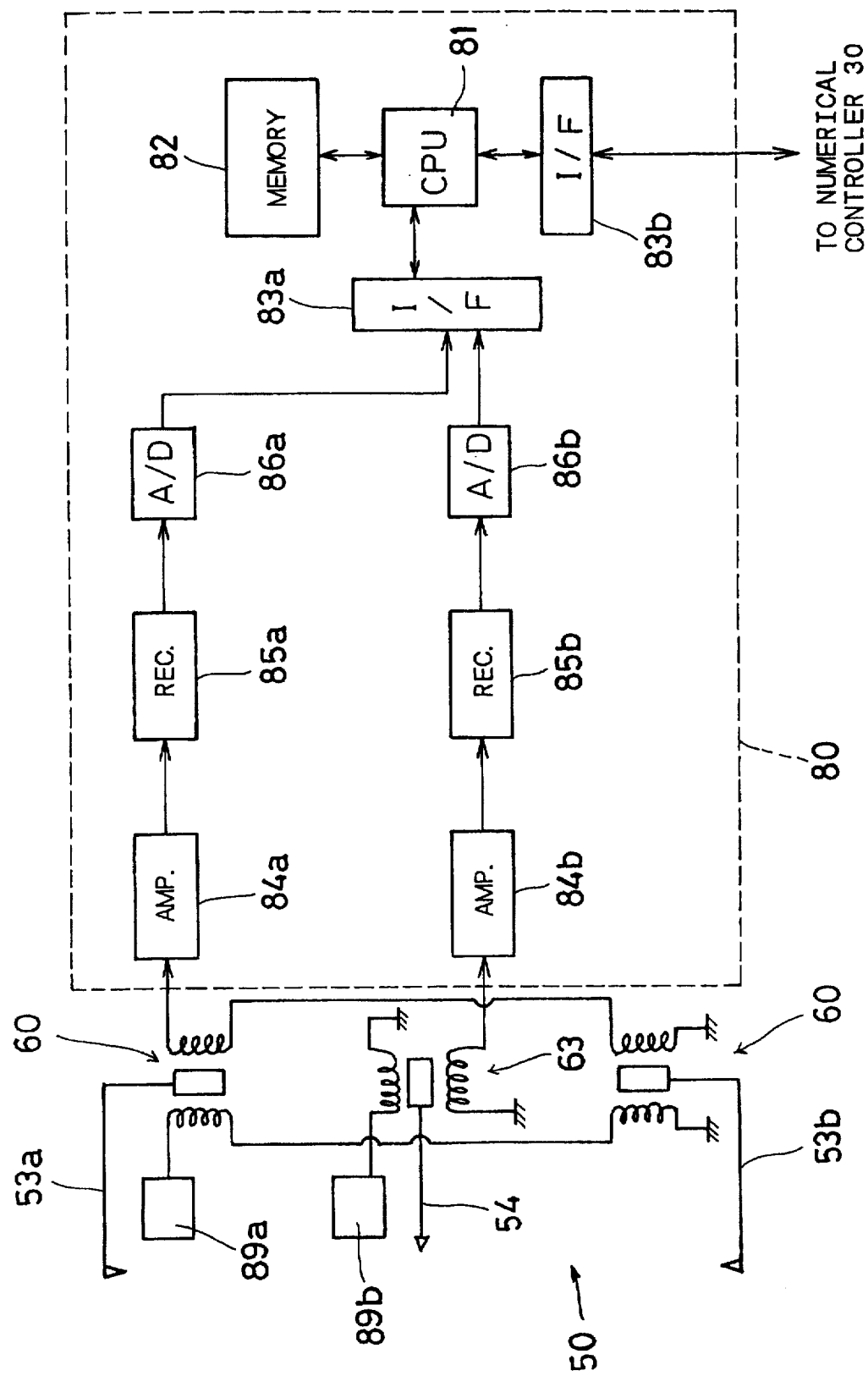
FIG. 4 is a block diagram showing the configuration of a measuring apparatus used in the grinding machine shown in FIG. 2.
Figure 5:
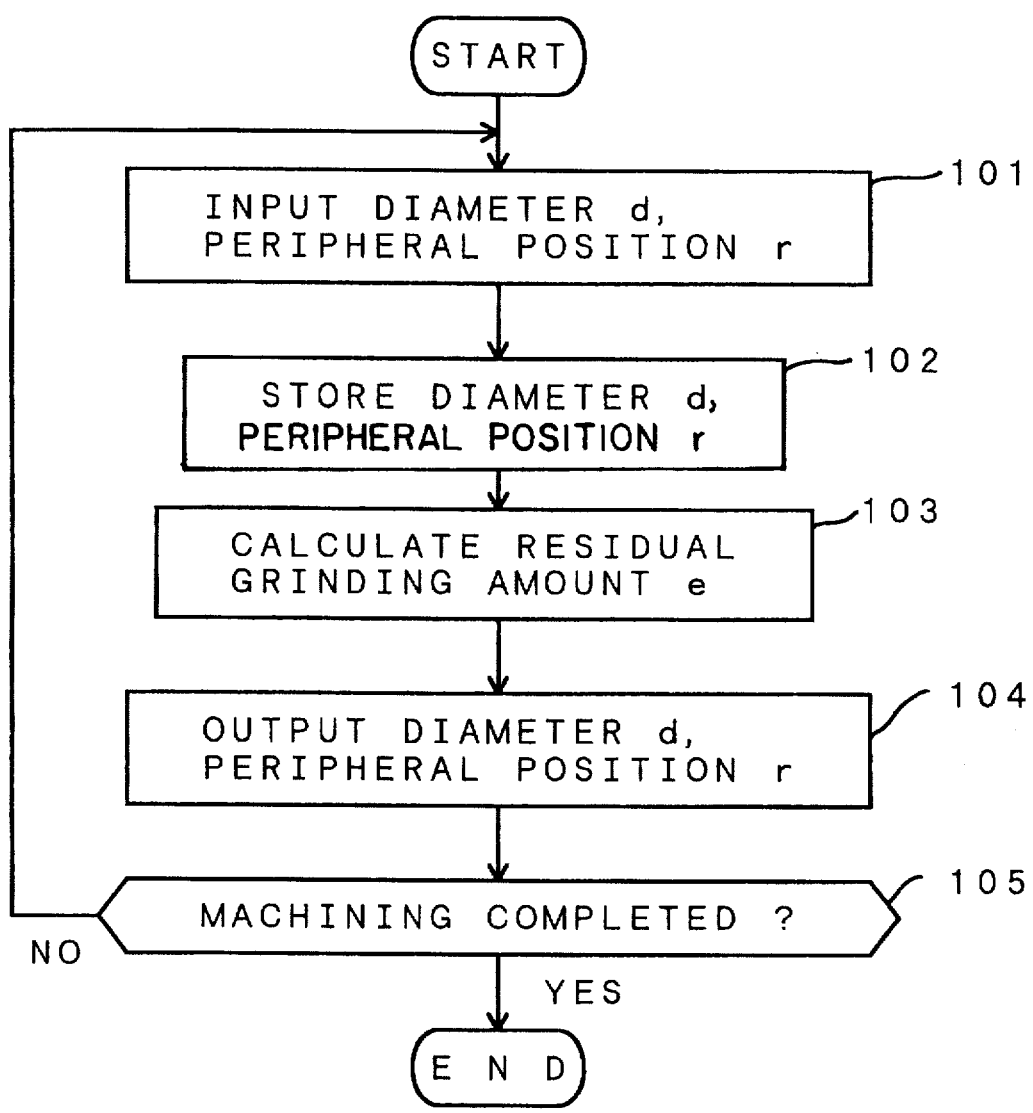
FIG. 5 is a flowchart showing the operation of the measuring apparatus shown in FIG. 4.
Figure 6:
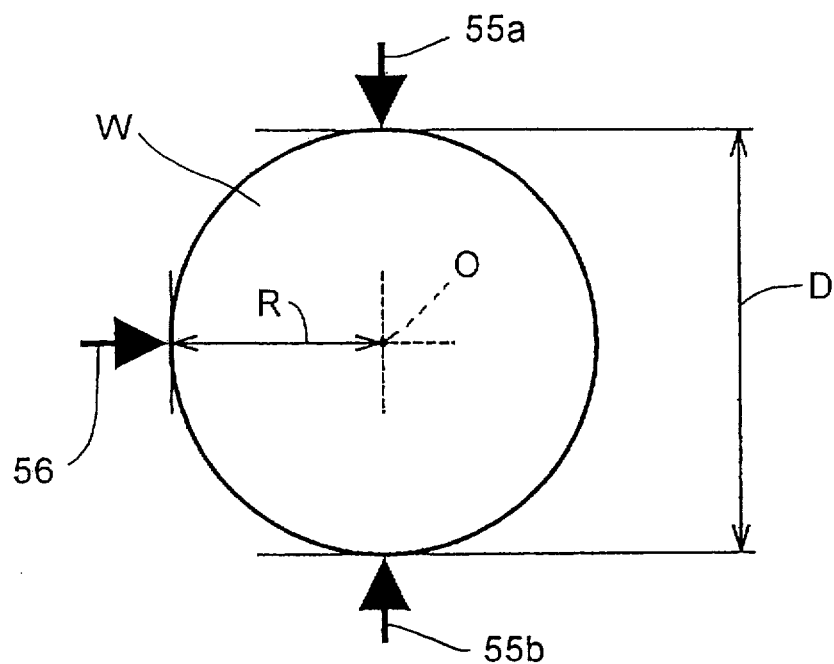
FIG. 6 is an explanatory chart showing measuring points on a workpiece before machining.

As shown in FIG. 4, the measuring apparatus 80 consists of amplifying circuits 84a and 84b, rectifying circuits 85a and 85b, A/D converters 86a and 86b, a CPU 81, a memory 82, and interfaces 83a and 83b. AC measurement signals output from the first and second displacement detectors 60 and 63 of the measuring head 50 are amplified by the amplifying circuits 84a and 84b and then rectified by the rectifying circuits 85a and 85b so as to obtain DC measurement signals. The DC measurement signals are converted into digital signals by the A/D converters 86a and 86b. The CPU 81 calculates the outer diameter of the workpiece W and the residual grinding amount based on the digital signals. The memory 82 stores therein a calculation program as shown in FIG. 5, which is used for calculating, based on the digital signals, the outer diameter of the workpiece W and the residual grinding amount. The interface 83a inputs to the CPU 81 digital measurement signals which are output from the A/D converters 86a and 86b. The interface 83b inputs command signals from a numerical controller 30 and outputs to the numerical controller 30 the outer diameter of the workpiece W and the residual grinding amount calculated by the CPU 81. Numerals 89a and 89b denote power supplies for supplying alternating current to the coils 61a, 61b and 67. The CPU 81 and the memory 82 constitute calculation means. As shown in FIG. 2, the numerical controller 30 consists of a central processing unit (CPU) 31 for controlling and managing the overall operation of the grinding machine, a memory 32, and an interface 33 for exchanging data with external devices.

The digital servo units 41 and 42 and the position detectors 25 and 27 are connected to the interface 33. When command signals are supplied from the interface 33 to the digital servo units 41 and 42, the wheel head 13 and the table 12 are moved, and the present positions of the wheel head 13 and the table 12 are input to the interface 33. The above-described measuring apparatus 80 is also connected to the interface 33 so as to receive from the measuring apparatus 80 the outer diameter of the workpiece W and the residual grinding amount calculated by the CPU 81. Further, an input device 40 such as a keyboard for inputting control data and the like is connected to the interface 33. The memory 32 stores a machining program and various parameters.

Next, the operation of the grinding machine having the above-described structure will be described in detail with reference to the flowchart shown in FIG. 5.

Before starting a grinding operation, reference values are measured in the following manner. A master workpiece, which has been ground to have a true cylindrical shape, is first attached between the centers 15a and 16a on the table 12. Subsequently, the head feed unit 28 is driven so as to advance the measuring head 50, whereby the first, second and third feelers 55a, 55b and 56 contact the master workpiece. In this state, the diameter D and the peripheral position R of the master workpiece are measured. In the present embodiment, the peripheral position R is measured as a distance from a theoretical rotational axis O around which each workpiece to be rotated. The thus measured diameter D and the peripheral position R are stored in the memory 82 of the measuring apparatus 80 as reference values. After that, the head feed unit 28 is driven to retract the measuring head 50, and the master workpiece is removed. Then, a workpiece W to be ground is mounted between the centers 15a and 16a, and a grinding operation is started.

When a machining start command from the input device 40 is input to the numerical controller 30, the numerical controller 30 executes a machining program stored in the memory 32. First, the motors 18 and 22 are driven so as to rotate the workpiece W and the grinding wheel 19 at predetermined rotational speeds, respectively, and the servomotor 23 is driven to advance the wheel head 13 for infeed movement. When the wheel head 13 is fed by a predetermined amount so that the scale (black skin portion) of the workpiece W is removed, the numerical controller 30 drives the head feed unit 28 so as to advance the measuring head 50. As a result, the first, second, and third feelers 55a, 55b and 56 contact the workpiece W. In this state, the diameter d and the peripheral position r of the workpiece are measured by the first and second displacement detectors 60 and 63 of the measuring head 50. The measuring apparatus 80 calculates a residual grinding amount based on the diameter d and the peripheral position r of the workpiece measured by the first and second displacement detectors 60 and 63, and outputs the calculated residual grinding amount to the numerical controller 30 at predetermined sampling intervals.

Figure 7:
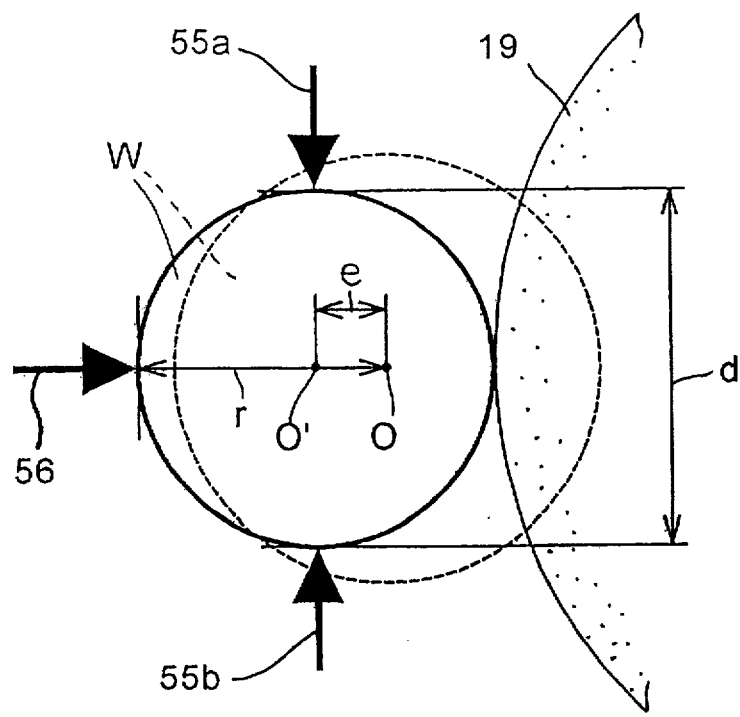
FIG. 7 is an explanatory chart showing the measuring positions on the workpiece during machining and a residual grinding amount.

The calculation of the residual grinding amount performed by the measuring apparatus 80 will now be described with reference to the flowchart shown in FIG. 5 and the explanatory chart shown in FIG. 7.

When measurement by the measuring head 50 is started, the CPU, 81 of the measuring apparatus 80 executes the residual grinding amount calculating program shown in FIG. 5, which is stored in the memory 82, In step 101, the diameter d and the peripheral position r of the workpiece which are measured by the first and second displacement detectors 60 and 63 are input. In step 102, these measured values are stored in the memory 82.

When the processing moves to step 103, the residual grinding mount e is calculated by the following equation:

$$e = (r-R) - \frac{d-D}{2} \tag{1}$$

At this time, the workpiece W is being ground in a state in which it deflects, due to grinding resistance, by an amount corresponding to the residual grinding amount e. Therefore, the rotational axis of the work piece W moves from O to O '. Since the first and second feelers 55a and 55b contact the workpiece W at points on a diametral line perpendicular to the direction of deflection of the workpiece W, the first displacement detector 60 can detect the diameter of the workpiece W without being affected by the deflection (residual grinding amount e) of the workpiece W. In contrast, the third feeler 56 contacts the workpiece W at a point opposite to the grinding point with respect to the rotational axis O', the peripheral position r detected by the second displacement detector 63 contains the amount of deflection (residual grinding amount e). Therefore, in the equation (1), half of the diameter d (i.e., radius (d/2)) of the workpiece W measured by the first displacement detector 60 is subtracted from the peripheral position r measured by the second displacement detector 63 so as to obtain the amounts of deflection (residual grinding amount) e. In the equations (1), since the reference values R and D are subtracted from the measured peripheral position r and diameter d, the residual grinding amount e calculated by the equation (1) is an offset value (relative value) with respect to the master workpiece.

When the processing moves to step 104, the diameter of the workpiece W memorized in step 102, and the residual grinding amount e calculated in step 103 are output to the numerical controller 30. In subsequent step 105, it is judged whether the machining has been completed. When it is judged that the machining has not been completed, the processing from step 101 to step 104 is repeated. When it is judged that the machining has been completed, the residual grinding amount calculating program is ended.

The numerical controller 30 carries out various kinds of grinding steps based on the diameter d of the workpiece W and the residual grinding amount e input from the measuring apparatus 80.

In the present embodiment, the first measuring section 50a and the second measuring section 50b are integrated within the measuring head 50. However, it is possible to use a conventional in-process measuring device as the first measuring section 50a and to provide only the second measuring section 50b as a separate device. Further, the calculation means calculating the grinding residual amount carried by the measuring apparatus 80 may be the numerical controller 30.

In the above-described embodiment, the diameter d and peripheral position r of the workpiece W are detected based on displacements of the first, second and third feelers 55a, 55b and 56. However, measuring means is not limited thereto. For example, non-contact type distance detectors may be used to detect the diameter d and peripheral position r of the workpiece W.

Obviously, numerous modifications and variations of the present invention are possible in light of the above teachings. It is therefore to be understood that within the scope of the appended claims, the present invention may be practiced otherwise than as specifically described herein.

What is claimed is:

1. A method for detecting a residual grinding amount produced due to a grinding resistance between a workpiece and a grinding wheel during a grinding operation, said method comprising the steps of:

measuring an outer diameter of a workpiece in a direction perpendicular to a direction of deflection of the workpiece;

measuring a position of a peripheral surface of the workpiece in the direction of deflection of the workpiece; and calculating a residual grinding amount based on the measured outer diameter of the workpiece and the measured position of the peripheral surface of the workpiece.

2. A method for detecting a residual grinding amount according to claim 1, wherein said method further comprises the step of measuring an outer diameter and a position of a peripheral surface of a master workpiece, said residual grinding amount being calculated based on the measured outer diameter of the master workpiece and the position of the peripheral surface of the master workpiece, and the measured outer diameter of the workpiece and the position of the peripheral surface of the workpiece.

3. A method for detecting a residual grinding amount according to claim 2, wherein said residual grinding amount (e) is calculated by the following equation:

$$e = (r-R) - \frac{d-D}{2}$$

where r is the measured outer diameter of the workpiece, R is the measured outer diameter of the master workpiece, d is the measured position of the peripheral surface of the workpiece, and D is the measured position of the peripheral surface of the master workpiece.

4. An apparatus for detecting a residual grinding amount produced due to a grinding resistance between a workpiece and a grinding wheel during a grinding operation, said apparatus comprising:

a first measuring device which measures an outer diameter of a workpiece in a direction perpendicular to a direction of defection of the workpiece;

a second measuring device which measures a position of a peripheral surface of the workpiece in the direction of deflection of the workpiece; and a calculation unit which calculates a residual grinding amount based on the outer diameter of the workpiece measured by the first measuring device and the position of the peripheral surface of the workpiece measured by the second measuring device.

5. An apparatus for detecting a residual grinding amount according to claim 4, wherein said first and second measuring devices are provided in a common measuring head.

6. An apparatus for detecting a residual grinding amount according to claim 5, wherein said first measuring device comprises first and second feelers adapted to contact the peripheral surface of the workpiece such that the first and second feelers move, in accordance with a variation in the diameter of the workpiece, in opposite directions each perpendicular to the direction of deflection of the workpiece, and a first displacement detector which detects relative displacement between the first and second feelers; and said second measuring device comprises a third feeler adapted to contact the peripheral surface of the workpiece such that the third feeler moves, in accordance with the variation in the diameter of the workpiece and a variation in the deflection of the workpiece, in the direction of deflection of the workpiece, and a second displacement detector which detects displacement of the third feeler.

7. An apparatus for detecting a residual grinding amount according to claim 4, further comprising a master workpiece, wherein an outer diameter and a position of a peripheral surface of the master workpiece are respectively measured by said first and second measuring devices, said residual grinding amount being calculated based on the measured outer diameter of the master workpiece and the measured position of the peripheral surface of the master workpiece, and the measured outer diameter of the workpiece and the measured position of the peripheral surface of the workpiece.

8. An apparatus for detecting a residual grinding amount according to claim 7, wherein said calculation unit calculates said residual grinding amount (e) by the following equation:

$$e = (r - R) - \frac{d - D}{2}$$

where r is the measured outer diameter of the workpiece, R is the measured outer diameter of the master workpiece, d is the measured position of the peripheral surface of the workpiece, and D is the measured position of the peripheral surface of the master workpiece.

* * * * *